May 2, 1967

E. W. ROBERTSON 3,316,596

MEANS TO LATCH TOGETHER THE MEETING ENDS OF
COLLAPSIBLE CURING RIMS

Filed June 18, 1965

INVENTOR
ELMER W. ROBERTSON
BY George B. White
ATTORNEY

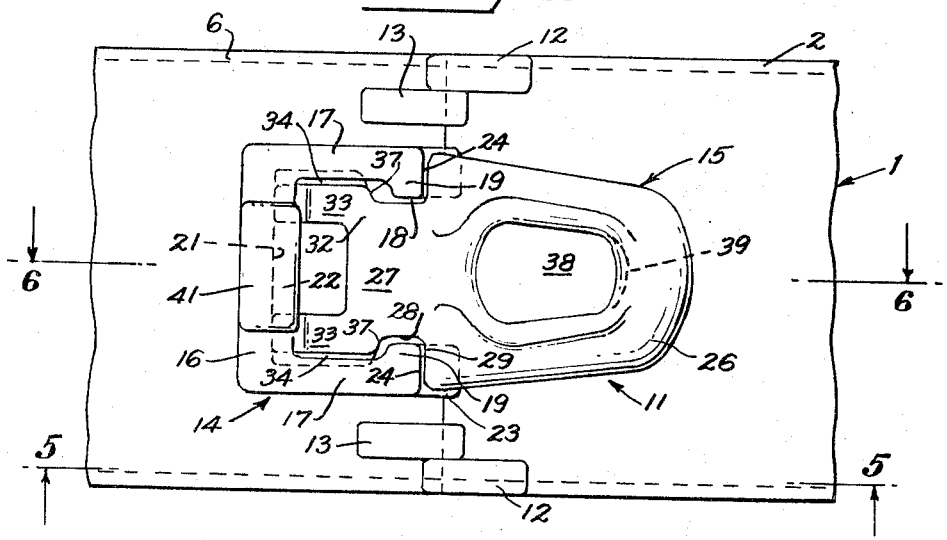
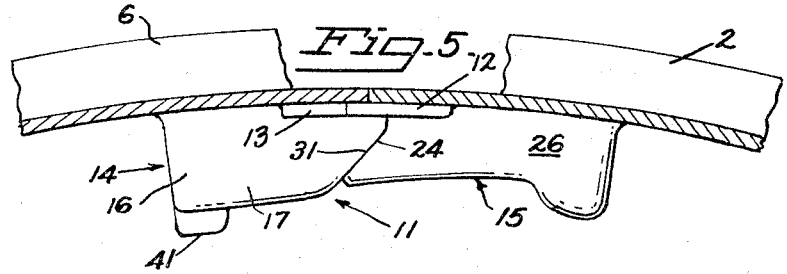
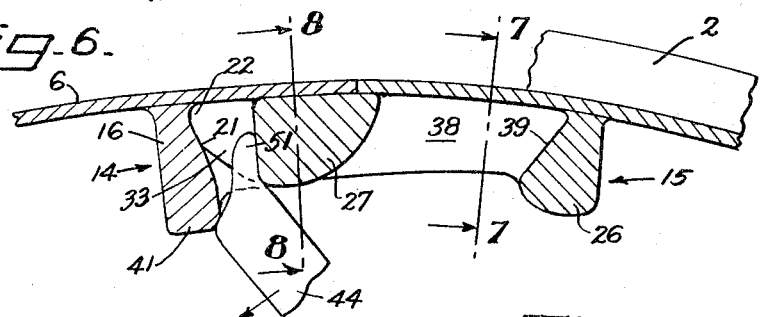
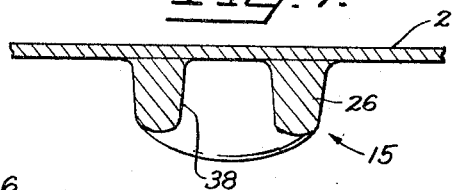
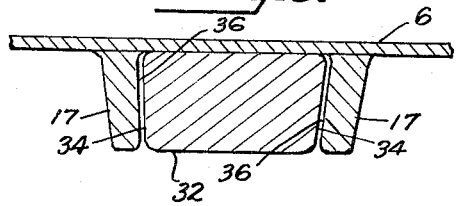

United States Patent Office 3,316,596
Patented May 2, 1967

3,316,596
MEANS TO LATCH TOGETHER THE MEETING ENDS OF COLLAPSIBLE CURING RIMS
Elmer W. Robertson, 6965 Park Blvd., Oakland, Calif. 94611
Filed June 18, 1965, Ser. No. 465,056
7 Claims. (Cl. 18—43)

This invention relates to means to latch together the separable ends of collapsible curing rims utilized in retreading or recapping of tires.

Such collapsible curing rims are placed within a tire casing usually before the tire is placed in the mold and after the innertube is inserted into the tire casing. The purpose of the collapsible rim is to engage and support the curing bag within the tire casing. In order to facilitate the insertion of the curing rim into the tire casing, the same is made collapsible.

Such collapsible curing rims are made of a plurality of individual segments connected by suitable hinges so that the entire unit can be collapsed and subsequently expanded within the tire casing and into a full circle mold. In order that the collapsible rim be maintained in its expanded attitude, there is provided a latch device for connecting the end segments of the collapsible rim which latch device prevents the collapse of the rim when unusual forces are applied to it.

The primary object of the invention is to provide means for connecting the end segments of a collapsible curing rim which means is capable of positively holding the rim segments in extended or expanded position so as to provide a continuous full circle rim within the tire, and which means can be connected or separated by relative circumferential spreading of the segment ends apart.

Another object of the invention is to provide co-acting latch elements on the meeting ends of the end segments of a collapsible curing rim at least one of which is engageable by a leverage tool for spreading the segment ends apart and which is also adapted to permit the leverage tool to pull one of the segments relatively to the other segment circumferentially as well as radially inwardly for disengagement and engagement of the ends.

Another object of the invention is to provide latch means for connecting the meeting ends of the end segments of a collapsible curing rim in which a female socket on one of said ends is engaged by a male member on the other of said ends, and wherein the engaging end of the male latch member is so formed relatively to the sides of the female socket as to interlock with said female socket and prevent disengagement by radial forces on the end sections, and whereby for disengagement and engagement the male member is shifted circumferentially and then radially inwardly relatively to said female socket.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is an inside plan view of the latch closed.

FIG. 5 is a side view of the closed latch on an enlarged scale viewing in the direction of lines 5—5 of FIG. 3.

FIG. 6 is a sectional view taken on lines 6—6 of FIG. 3.

FIG. 7 is a cross sectional view taken on lines 7—7 of FIG. 6.

FIG. 8 is a cross sectional view taken on lines 8—8 of FIG. 6.

Figure 1:
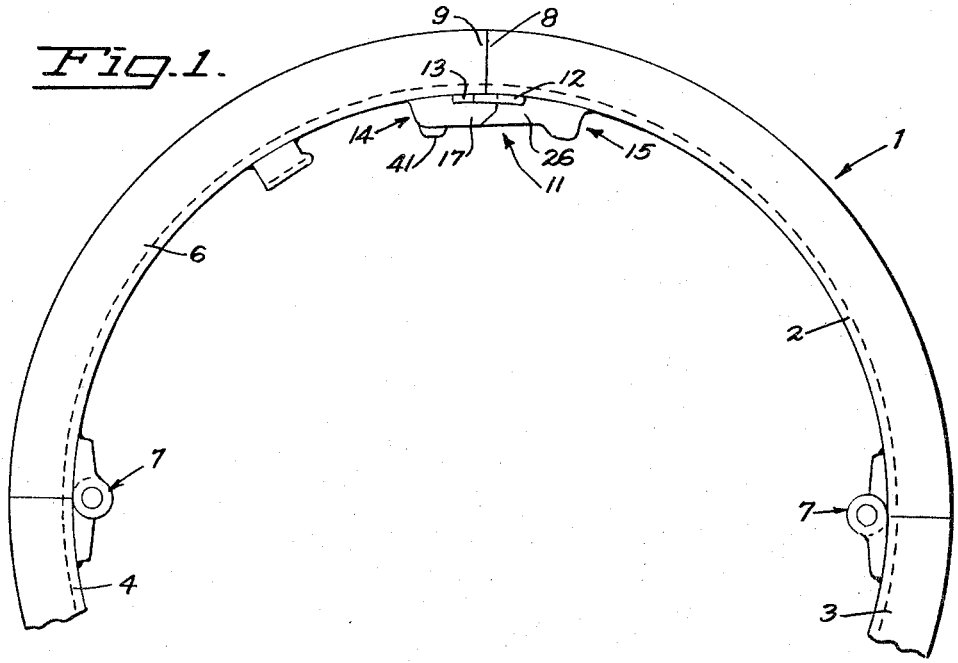
FIG. 1 is a fragmental view of a collapsible rim showing the latch closed.

The curing rim 1, in the present illustration, is made of segments, of which the segments 2, 3, 4 and 6 are shown in FIG. 1.

The meeting ends of the segments are connected by suitable collapsible hinges 7, except that the meeting ends 8 and 9 are respectively of end segments 2 and 6, are in abutting relation and are held together by a latch device 11. Usual guide lugs 12 and 13 extend from the meeting ends 8 and 9 and overlap the other meeting end respectively for aligning the meeting ends in abutting position.

The improvement resides in providing a female member 14 on the under-side or inside of the segment 6 and a male member 15 on the inside of the end segment 2 coacting in the manner hereinafter described.

The female member 14 has a generally U-shaped cavity with a closed end wall 16, side walls 17 and an opening 18 opposite the closed end wall 16. The ends of side walls 17 have inwardly extended abutment ribs 19 which project into the opening 18 so as to render the opening 18 narrower than the space between the side walls 17.

The closed end wall 16 of the female member 14 has its inner socket wall 21 undercut and inclined toward the end segment 6 and away from the opening 18 so as to form a retaining socket 22 under and along the base of the closed end wall 16.

The female member 14 is suitably fixed on the end segment 6 so that the ends of the side walls 17 project slightly beyond the meeting end 9 and over and beyond the meeting end 8 of the respective segments. The projecting ends 23 of the side walls 17 are cut away or mitered at the top for providing inclined abutment walls 24.

The male member 15 has a hollow body 26 suitably secured, such as by welding, to the end segment 2. A bolt 27 extends from the body 26. This bolt 27 has a reduced neck 28 which slidably fits between the ribs 19 in the opening 18. The shoulders 29 of the neck 28 are also mitered to form abutment walls 31 fitting over the abutment walls 24 on the projecting ends 23, thereby to positively pre-determine the relation of the meeting ends 8 and 9 in the circular attitude of the curing rim.

The end of the bolt 27 is laterally enlarged to form a head 32 which is preferably forked as shown. The extreme end of the head 32, or the fingers 33 thereof are also mitered, tapering so as to fit into the socket 22 in engagement with the inner socket wall 21 at the base of the closed end wall 16 of the female member 14. The side walls 34 of the head 32 are also tapered outwardly and toward the adjacent segment. The portions of the socket side walls 17 are correspondingly tapered or undercut under the side walls adjacent the base of the closed end wall 16 so as to form the sides of the inner socket 22. In this manner the head of the bolt 32 is wedged in place and cannot be removed from the inner socket 22 of the female member 14 until and unless the bolt head 32 is first pulled circumferentially of the curing rim out of the inner socket 22 past the inclined portions 36 of the socket side walls 17. Usually the head 32 has to be pulled out until the head shoulders 37 abut the ribs 19.

After the end segments 2 and 6 are pulled apart sufficiently to pull the head shoulders 37 against the socket ribs 19 an inward radial force is applied to move the head 32 radially inwardly out of the female member 14 thereby permitting the collapsing of the curing rim.

For the purpose of imparting such circumferential and inward radial force, the male member 15 has a tool socket 38 in the body 26 with an undercut socket end 39 at the end of the male body 26 farthest from the head 32. A suitable tool can be inserted into the undercut socket 39 to exert the force for pulling the male member 15 and the end segment 2 circumferentially and also radially inwardly for the disengagement of the bolt head 32 as heretofore described.

On the top of the closed end wall 16 of the female member 14 and above the inner socket 22 is a boss 41 which may be engaged by a part of a suitable tool to brace the tool for the force exerted on the tool socket 38.

For using the customary prying tool 42 a suitable lug 43 is provided on the end segment 6 spaced from the closed end wall 16 of the female member 14. This lug 43 is hollow.

Figure 2:
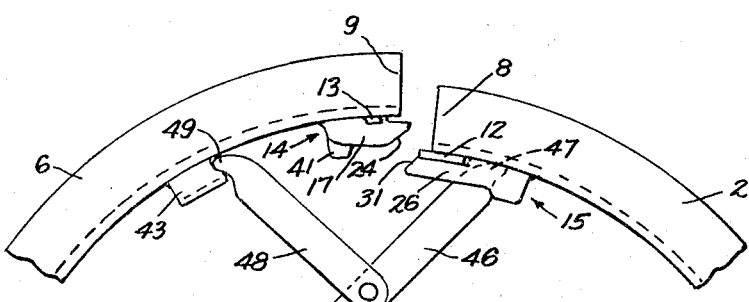
FIG. 2 is a fragmental view of the rim showing the latch forced open.

In operation the prying tool 42 usually has a handle 44 with a bent prying arm 46 having a point 47 adapted to engage the tool socket 38 and particularly the undercut socket end 39. A pivoted arm 48 on the handle 44 has its point 49 engageable with the hollow lug 43 so that as the handle 44 is pushed in the direction of the arrow indicated in FIG. 2, the tool exerts a circumferential and radial inward force in the undercut socket end 39 to push the male member 15 circumferentially and radially inwardly, thereby to push the meeting ends 8 and 9 apart and withdraw the head 32 from the socket 22 of the female member 14, for collapsing the curing rim.

Figure 3:
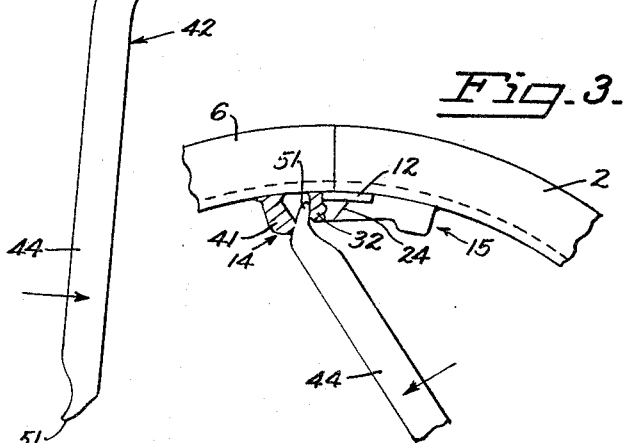
FIG. 3 is a fragmental view of the rim showing a modified engagement of the prying tool with the latch.

Another, yet simpler application of the tool is illustrated in FIGS. 3 and 6. The handle 44 of the prying tool has a prying finger 51 at its handle end fitting into the space between the fingers 33 so as to bear against the head 32 and also against the boss 41. When the tool handle 44 is turned in the direction of the arrow in FIGS. 3 and 6, the prying finger 51 braced against boss 41 pushes the male member 15 circumferentially away from the female member 14 until the fingers 33 are withdrawn from the sockets 21 and 38 and then pushes the male member 15 radially inwardly for complete disengagement of the latch members 14 and 15.

I claim:

1. Means for latching together the meeting ends of end segments of a collapsible curing rim, comprising,
   (a) a female member secured to the inside of one of said meeting ends,
   (b) a male member secured to the inside of the other meeting end,
   (c) a female socket formed in said female member, said female socket being open toward the adjacent meeting end,
   (d) a bolt on said male member insertable through said open end and interlocked with an end of said socket and being withdrawable therefrom by moving longitudinally of said bolt,
   (e) means on said male member engageable by a prying tool for exerting force circumferentially of the rim and radially inwardly, thereby to withdraw said bolt from said socket longitudinally and radially inwardly to disengage said members and said meeting ends of said end segments.

2. The latching means for collapsible curing rims defined in claim 1, and
   (f) said female socket being generally U-shaped and being defined by spaced sidewalls and closed end wall,
   (g) an inner interlocking socket formed in the end of said female socket under said closed end wall,
   (h) said bolt including a head fitting into said inner interlocking socket and being removable from the remaining portion of said female socket radially inwardly of said rim.

3. The latching means defined in claim 2, and
   (i) spaced limit elements on the ends of said side walls projecting between said side walls to form a reduced opening with said socket,
   (j) a neck formed on said bolt slidably fitting between said limit elements for guiding limited longitudinal movement of said bolt,
   (k) and shoulders at each end of said neck coacting with said limit elements to determine the respective positions of said bolt in withdrawn and in interlocking attitudes.

4. Means for latching together the meeting ends of end segments of a collapsible curing rim, comprising
   (a) a female member secured to the inside of one of said meeting ends,
   (b) a male member secured to the inside of the other of said meeting ends,
   (c) spaced side walls of said female member defining a female socket,
   (d) an end wall spaced from the adjacent meeting end connecting said sides,
   (e) said end member and adjacent portions of said side walls being undercut to form an inner socket with inclined walls under said end wall,
   (f) the ends of said side walls adjacent said meeting ends being spaced to form an opening leading into the space between said side walls,
   (g) limit ribs on the spaced ends of said side walls projecting into said opening,
   (h) a bolt projecting from said male member into said female member,
   (i) a head on said bolt fitting into said inner socket under said end wall to interlock said members,
   (j) a neck on said bolt slidably fitting in said opening,
   (k) shoulders on said neck engageable with said limit ribs to limit the relative circumferential movement of said members,
   (l) and a prying socket formed in said male member engageable by a prying tool for exerting circumferential and inward radial force relatively to said rim for moving said bolt out of said inner socket longitudinally and out of said socket of said female member radially inwardly for disconnecting said meeting ends.

5. The latching means for collapsible curing rims defined in claim 4, and
   (m) said limit ribs projecting beyond the adjacent meeting end and beyond the other meeting end.

6. The latching means for collapsible curing rims defined in claim 4, and
   (m) an inwardly projecting lug spaced from the closed end wall of said female member on the same end segment engageable by said prying tool for bracing said prying tool when engaged with said prying socket.

7. Means for latching together the meeting ends of end segments of a collapsible curing rim, comprising
   (a) a female member secured to the inside of one of said meeting ends,
   (b) a male member secured to the inside of the other of said meeting ends,
   (c) spaced side walls of said female member defining a female socket,
   (d) an end wall spaced from the adjacent meeting end connecting said sides,
   (e) said end member and adjacent portions of said side walls being undercut to form an inner socket with inclined walls under said end wall,
   (f) the ends of said side walls adjacent said meeting ends being spaced to form an opening leading into the space between said side walls, (g) limit ribs on the spaced ends of said side walls projecting into said opening,
(h) a bolt projecting from said male member into said female member,
(i) a head on said bolt fitting into said inner socket under said end wall to interlock said members,
(j) a neck on said bolt slidably fitting in said opening,
(k) said head being formed with a prying space therein,
(l) a bracing portion formed on said end wall of said female member opposite said prying space whereby the turning of a prying tool inserted into said prying space and braced against said bracing portion pushes said members apart for releasing said bolt from said female member.

References Cited by the Examiner

UNITED STATES PATENTS

| | | |
|---|---|---|
| 2,322,546 | 6/1943 | Sepin. |
| 2,850,768 | 9/1958 | Elrick et al. 18—45 |
| 2,985,917 | 5/1961 | Sunday 18—43 |
| 3,167,818 | 2/1965 | Ross. |
| 3,227,251 | 1/1966 | Ross 18—45 XR |

J. SPENCER OVERHOLSER, *Primary Examiner.*

J. HOWARD FLINT, Jr., *Examiner.*